Dec. 13, 1960     A. R. J. PIKE     2,963,774

MANUFACTURE OF COMMUTATORS HAVING MOLDED CORES

Filed Sept. 17, 1956

INVENTOR.
ALFRED R. J. PIKE,
BY *Allen & Allen*

ATTORNEYS.

United States Patent Office 2,963,774
Patented Dec. 13, 1960

2,963,774

MANUFACTURE OF COMMUTATORS HAVING MOLDED CORES

Alfred R. J. Pike, Kettering, Ohio, assignor to Dayton Precision Manufacturing Company, Dayton, Ohio, a corporation of Delaware Filed Sept. 17, 1956, Ser. No. 610,368

2 Claims. (Cl. 29—155.54)

The invention relates to the manufacture of small commutators having bodies formed by molding synthetic, thermosetting plastic materials, and has for its principal object the provision of means and a method whereby the commutator segments may be more positively anchored in the body of the plastic.

It is an object of the invention to provide a commutator having improved characteristics.

It is an object of the invention to provide a means and method for anchoring the segments which is simpler, less expensive, and less likely to produce shorts between segments.

These and other objects of the invention, which will be set forth hereinafter or will be apparent to one skilled in the art upon reading these specifications, are accomplished by that certain construction and arrangement of parts and in that procedure, of which an exemplary embodiment will now be described. Reference is made to the accompanying drawings wherein.

It has hitherto been suggested to form a relatively small commutator by providing a copper ring with inward, radially extending ribs, and to form a body within and somewhat beyond the ends of the ring by the molding of a suitable synthetic resin in which the ribs become embedded, after which the ring is severed into individual segments, each with one or more ribs.

The rib ring may be formed in various ways, as by broaching a section of copper tubing, by extrusion, or by forming ribs on a bar of metal and curving it into ring form. Difficulty has been encountered in anchoring the ribs to the plastic. Straight-sided ribs do not anchor satisfactorily even where there are more than one rib on each segment. It has hitherto been proposed to bend the ribs laterally or out of their normal radial planes in different directions in different areas of the length of the commutator. This is not only difficult to do but increases the hazard of shorting the commutator by bringing the ribs in contact with each other, and the bent ribs tend to interfere with the flow of plastic.

In the practice of the present invention, end portions of the ribs are detached from the ring and bent inwardly radially. This enables the plastic to get behind the end portions of the ring and provide a firm anchorage, as will hereinafter be explained.

Figure 1:
Fig. 1 is an elevational view of a blank for extrusion.
Figure 2:
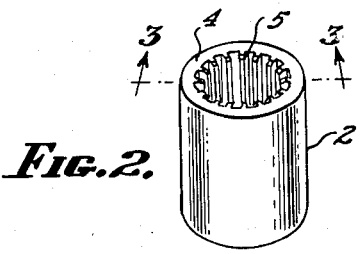
Fig. 2 is a perspective view of an extruded article.
Figure 3:
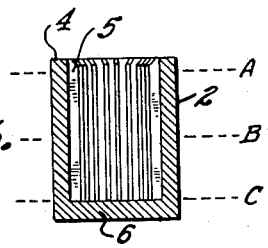
Fig. 3 is a sectional view thereof taken along the section line 3—3 of Fig. 2.

In an exemplary procedure for the manufacture of commutators, a cylindrical slug of metal 1 is formed as shown in Fig. 1. The slug may be made by cutting pieces from rod stock as for example, copper rod stock and dressing them; but it may also be formed in other ways. The slug is placed in an hydraulic or mechanical press in the cavity of a suitable mold on the press bed, and a plunger, which is radially grooved to form the ribs, is brought down onto the slug under heavy hydraulic or mechanical pressure. The result is the extrusion of a thimble-like structure shown at 2 in Figs. 2 and 3. This structure is characterized by an outer cylindrical ring 4 and radially inwardly extending ribs 5. It is also closed on the bottom as at 6.

Figure 4:
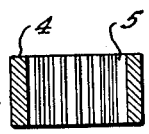
Fig. 4 is a sectional view of a ring cut from the structure of Figs. 2 and 3.

Commutator sections are made from this thimble by sawing it apart. Depending upon the dimensions of the desired commutators and the dimensions of the thimble, it is possible to make a plurality of ribbed rings from a single thimble, as for example by cutting the thimble of Fig. 3 with a gang saw along the lines A, B and C of that figure. The result is a plurality of the structures of Fig. 4, each characterized by the outer ring 4 and the inward radially extending ribs 5, the ring structure having the length desired for the commutator segments in the finished structure. The structure of Fig. 4 may next be cleaned in any suitable way, as for example, by sand blasting to free it of burrs, metal chips and the like.

Figure 5:
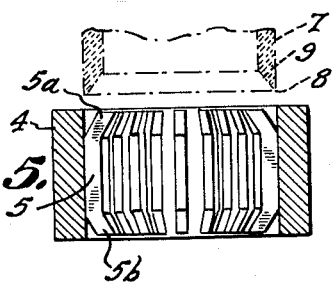
Fig. 5 shows on an enlarged scale a mode of treating the structure of Fig. 4 to prepare the ribs for anchoring.

The ribbed ring is next placed in a press and is treated by means of a cylindrical die indicated in dotted lines at 7 in Fig. 5. This die has an outer diameter which is equal to or slightly less than the internal diameter of the ring portion 4. It has a sharp outer cutting edge 8 which, when the die is brought down under pressure, severs end portions of the ribs from the ring. It also has an annular sloping deflecting surface 9. The result of the operation indicated in Fig. 5 on the grooved ring is, as indicated, the severing of end portions 5a from the ribs 5 and the bending over of the said end portions without deflection from their radial planes.

The ribbed ring is treated on both ends in a similar fashion, resulting in the freeing and bending over, as at 5b, of opposite end portions thereof. In commutators having relatively short lengths, as illustrated herein, it will be noted that a substantial portion of the length of each rib is bent inwardly to form anchoring means.

Figure 6:
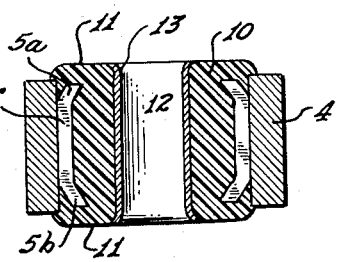
Fig. 6 is a sectional view of the commutator structure after molding.

The treated ribbed ring is next placed in a suitable mold and a core of thermosetting resin is molded within it, as indicated in Fig. 6. The formulation of the resinous material does not constitute a limitation on this invention. Any of those thermosetting resins, such as phenol formaldehyde resins which have hitherto been found suitable for the bodies of molded commutators, may be employed. The resinous body is indicated in Fig. 6 at 10. It preferably has hub-like portions 11 extending somewhat beyond the ends of the ring portion 4. It will have a central aperture to accept the shaft on which the commutator will be mounted in use; and in some forms of commutator a metal sleeve 13 may be incorporated.

The resin not only flows into the spaces between the ribs but also flows into the spaces behind the bent-over portions 5a and 5b of the ribs and, hardening into a monolithic block, firmly anchoring the ribs in a strong construction. The resultant article is shown in end elevation in Fig. 7, the ribs being indicated in dotted lines.

Figure 7:
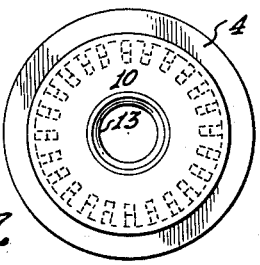
Fig. 7 is an end view thereof.
Figure 8:
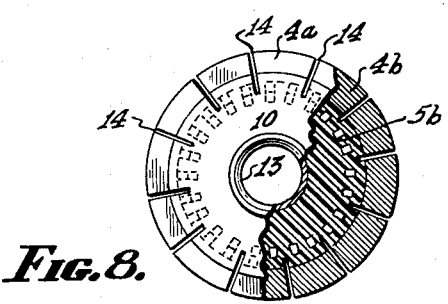
Fig. 8 is an end view of the commutator after the ring has been divided into segments. Parts of Fig. 8 are shown in section.

To form a completed commutator from the structure of Fig. 7, it is only necessary to cut the ring portion of the structure so as to divide it into commutator segments. This is done with reference to an index line provided on the ring 4 so that the slits or cuts will avoid and fall between the ribs. The cutting may be done by sawing individual slits and indexing the commutator between cuts; but it is more economically and conveniently done in one operation by subjecting the commutator ring to the action of a broach having internal, radially arranged saw-like members. The slits are indicated at 14 in Fig. 8. It will be noted that they extend entirely through the ring portion of the structure and slightly into the molded body, dividing the ring portions into segments 4a, 4b, etc., the segments being spaced by air gaps.

Modifications may be made in the invention without departing from the spirit of it. The invention having been described in an exemplary embodiment, what is claimed as new and desired to be secured by Letters Patent is:

1. A process of making molded commutators which comprises extruding a solid metal slug to form a metallic thimble having integral inward radially extending spaced ribs, cutting said thimble to form a ring, treating the said ring with a cutting and bending die engaging end portions of said ribs so as to free said end portions from said ring and bend said end portions inwardly in the same radial planes, and molding a body of thermosetting resin within and extending through said ring so as to fill the spaces between said ribs and wholly embrace the inwardly deflected end portions thereof.

2. A process of making molded commutators which comprises extruding a solid metal slug to form a metallic thimble having integral inward radially extending spaced ribs, cutting said thimble to form a ring, treating the said ring with a cutting and bending die engaging end portions of said ribs so as to free said end portions from said ring and bend said end portions inwardly in the same radial planes, and molding a body of thermosetting resin within and extending through said ring so as to fill the spaces between said ribs and wholly embrace the inwardly deflected end portions thereof, afterward severing the said ring portion into commutator segments by slitting at opposite spaces between the said ribs.

References Cited in the file of this patent

UNITED STATES PATENTS

| | | |
|---|---|---|
| 2,188,423 | Andrews | Jan. 30, 1940 |
| 2,541,047 | Frisbie | Feb. 13, 1951 |
| 2,600,312 | Meier | June 10, 1952 |
| 2,606,221 | Heintz | Aug. 5, 1952 |
| 2,618,844 | Wright et al. | Nov. 25, 1952 |
| 2,634,495 | Callsen et al. | Apr. 14, 1953 |
| 2,671,866 | Camprubi | Mar. 9, 1954 |

FOREIGN PATENTS

| | | |
|---|---|---|
| 816,437 | Germany | Oct. 11, 1951 |
| 1,011,170 | France | Apr. 2, 1952 |